(12) United States Patent
McCormick

(10) Patent No.: US 6,666,071 B1
(45) Date of Patent: Dec. 23, 2003

(54) METHOD AND APPARATUS FOR LEAK TESTING PLASTIC CONTAINERS

(76) Inventor: John McCormick, 14240 9$^{th}$ Line, RR 5, Georgetown, Ontario (CA), L7G 4S8

(*) Notice: Subject to any disclaimer, the term of this patent is extended or adjusted under 35 U.S.C. 154(b) by 0 days.

(21) Appl. No.: 10/171,996

(22) Filed: Jun. 17, 2002

(51) Int. Cl.$^7$ .................................. G01M 3/20
(52) U.S. Cl. ............................ 73/49.2; 73/41
(58) Field of Search ................ 73/41, 45, 45.1, 73/45.2, 45.4, 49.2, 49.3

(56) References Cited

U.S. PATENT DOCUMENTS

| | | | |
|---|---|---|---|
| 3,683,676 A | * | 8/1972 | Hass ........................ 73/45.1 |
| 3,879,987 A | * | 4/1975 | Yasuhiro et al. ............... 73/41 |
| 4,184,362 A | * | 1/1980 | Standley et al. ............. 73/40.7 |
| 4,459,843 A | * | 7/1984 | Durham ...................... 73/45.1 |
| 4,602,499 A | * | 7/1986 | Norton et al. ................. 73/41 |
| 5,918,270 A | * | 6/1999 | Heuft ........................ 73/45.4 |
| 6,050,134 A | * | 4/2000 | Strand ........................ 73/49.2 |

* cited by examiner

*Primary Examiner*—Daniel S. Larkin
(74) *Attorney, Agent, or Firm*—Bereskin & Parr

(57) ABSTRACT

A method and apparatus for leak testing moulded plastic containers in which the containers are conveyed seriatim along a linear path. Each successive container is pressurized at a first station along the path and then sealed to maintain pressurization while being disconnected from the source of pressure. A test station is provided a distance downstream along the path from the first station selected to allow pressure in the container to stabilize if there is no leak. At the test station, the pressure in each successive container is momentarily determined and a signal is provided if a container is determined to be leaking. The apparatus includes battery-powered test heads that are brought into engagement with successive containers at the first station and momentarily energized by an optical transmitter when a pressure reading is to be taken, so that battery power is conserved.

14 Claims, 5 Drawing Sheets

METHOD AND APPARATUS FOR LEAK TESTING PLASTIC CONTAINERS

FIELD OF THE INVENTION

This invention relates generally to leak testers for moulded plastic containers.

BACKGROUND OF THE INVENTION

In the blow moulding art, for example, it is normal to route containers leaving a blow moulding machine through a leak tester in which each container is pressurized with air to test for leaks.

Since the containers have some elasticity, the pressure in the container will rise to a peak as the container expands slightly under pressure, and then drop off as the container relaxes. If there is no leak, the pressure in the container will stabilize at a value lower than the peak value. The period of time required for the pressure to stabilize is determined for the particular containers being tested and the pressure in each container is monitored for that period, from initial pressurization. If the pressure is below the defined level at the end of the period, the container has a leak and is rejected.

DESCRIPTION OF THE PRIOR ART

In a typical conventional leak tester, the containers are conveyed in a part-circular path or loop for testing and are connected to a central source of pressurized air by way of a series of air hoses. Each hose is coupled to the source via a rotary coupling and extends to a test head that is clamped onto the mouth of the container being tested. In a typical conventional leak tester, there may be thirty test heads each with its own associated hose.

Once a container is pressurized, an associated fill valve is closed and the pressure in the container is measured during the test cycle. Each test head may have a pressure transducer and an individual processor to determine whether the container leaks. The leak data can be transmitted to a central processor via non-contact means, such as optical signals or via rotary commutator rings. The individual test heads remain connected to central sources of both power and air throughout the test process.

It will be appreciated from the foregoing description that conventional leak testers are quite complex and expensive. Not only that, but the leak tester may impose a limit on the through-put of containers being produced, since each container must remain in the leak test loop for a period of time sufficient to complete the pressure test. As an example, a prior art leak tester may be capable of handling a maximum of approximately 300 containers per minute.

SUMMARY OF THE INVENTION

An object of the present invention is to provide a leak tester which addresses at least some of these shortcomings of the prior art.

In one aspect, the invention provides a method of leak testing moulded plastic containers in which the containers are conveyed seriatim along a path. Each successive container is pressurized at a first station along the path using a defined source pressure and is then sealed to maintain pressurization. The container is then disconnected from the source. A test station is provided a distance downstream along the path from the first station selected to correspond to the time required to allow the pressure in the container to stabilize if there is no leak. Each sealed container is conveyed from the first station to the test station and the pressure in the container is momentarily determined at the test station. A signal is provided if the pressure in the container is below a defined value, indicating a leak.

A corresponding leak testing apparatus includes a conveyor for transporting the containers seriatim along a path. A pressurization unit is provided at a first station along said path and includes a defined pressure source. The apparatus also includes a plurality of self-contained test heads, each of which is adapted to sealingly engage the mouth of a said container, and means for bringing the test heads successively into said sealing engagement with the mouths of respective containers approaching said first station, and for successively disengaging the test heads from the containers at a test station spaced downstream from said first station a distance selected to allow pressure in each container to stabilize if there is no leak in the container. Each test head is adapted to momentarily engage the pressure source at the first station for pressurizing an associated container, and includes means for sealing the container against pressure loss following disengagement from said pressure source. Each head further includes a pressure transducer for determining the pressure in the container, means for signalling pressure lower than a defined value, and battery supply power means. The test head is normally de-energized but can be remotely energized momentarily when pressure in the container is to be measured. At the test station, the apparatus includes means for remotely energizing each test head so the said signalling means will provide an indication if the measured pressure is lower than said defined value.

The method and apparatus of the invention provide a number of significant advantages over prior art leak testers. A primary advantage is that the leak tester does not restrict the speed of container production. The test station can be positioned downstream from the first (air pressurization) station at whatever distance is required to allow time for the pressure within the container to stabilize and be measured. In prior art systems, the speed of travel of the containers must be restricted so that the containers remain within the loop of the leak tester for sufficient time to complete testing.

In the invention, there is no need for air hoses connecting the containers to the pressure source, or power supply wiring. The containers are momentarily connected to the pressure source at the first station and then sealed. The test heads are battery powered so that no wiring is required. The heads are energized only momentarily when a pressure reading is to be taken, so that battery life can be maximized.

Preferably, the test path is at least generally linear so that several leak tester "lines" can be installed side-by-side in minimum space.

BRIEF DESCRIPTION OF THE DRAWINGS

In order that the invention may be more clearly understood, reference will now be made to the accompanying drawings which illustrate a number of preferred embodiments of the invention by way of example, and in which.

DESCRIPTION OF PREFERRED EMBODIMENTS

Figure 1:
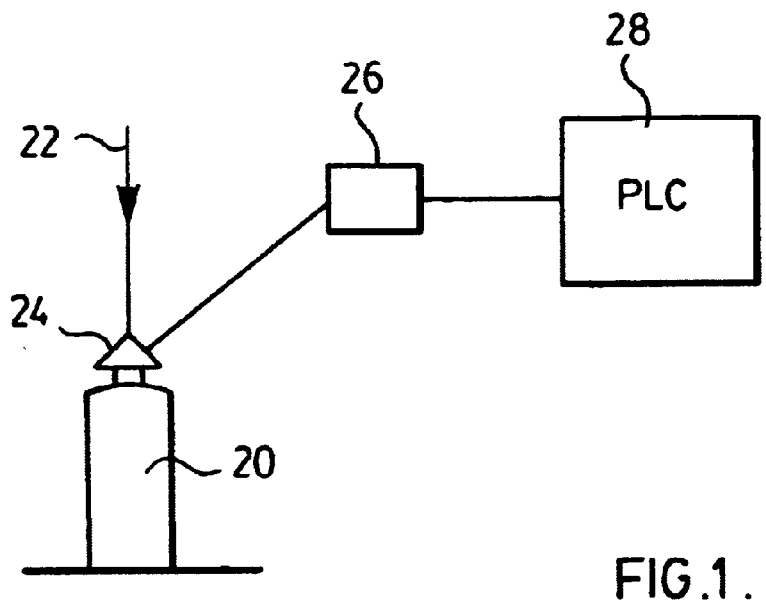
FIG. 1 is a diagrammatic illustration of a typical method of testing blow moulded plastic containers for leaks.

Referring first to FIG. 1, a blow moulded plastic container is shown at 20 undergoing a typical leak testing cycle. Air is introduced into the container under pressure from a source 22, through a test head 24 that is sealingly engaged with the mouth of the container. A pressure transducer 26 is also connected to the test head and provides to a programmable logic controller 28, a signal representative of the pressure within the container. Typically, the pressure of the source 22 is slightly above atmospheric pressure, for example, 0.6 psi over atmospheric pressure.

Figure 2:
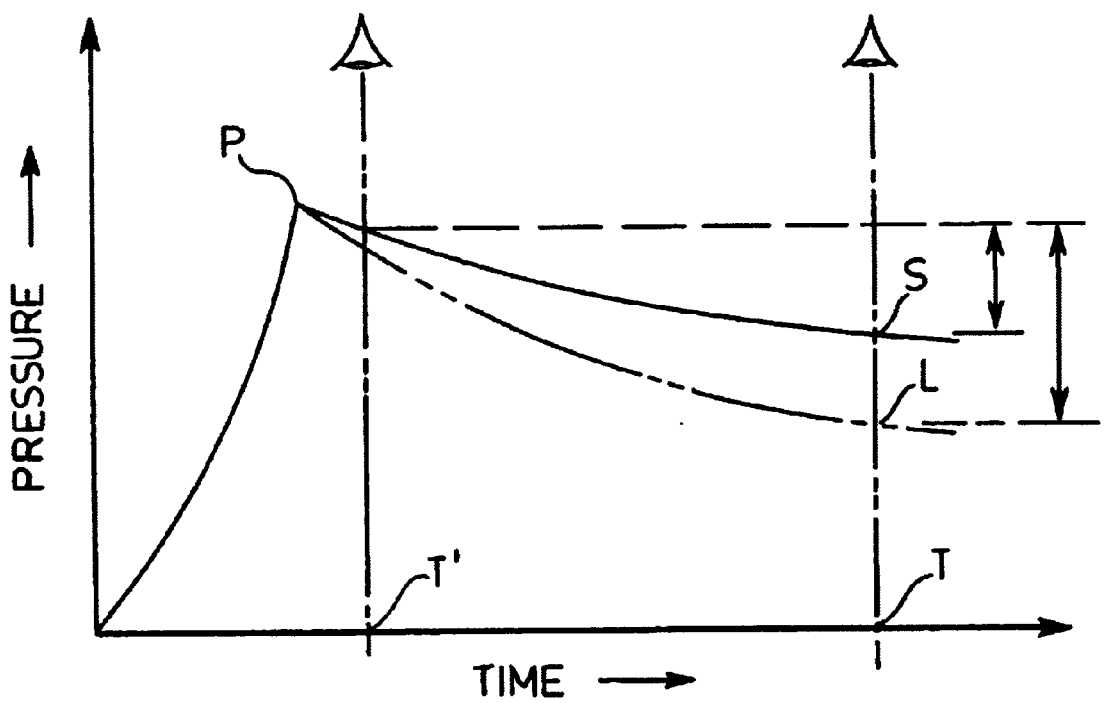
FIG. 2 is a graph of pressure against time during pressure testing of a single container.

FIG. 2 is a graph showing the pressure in the container 20 with respect to time. It will be seen that the pressure rises to a peak P as the container expands slightly, and then drops off as the container relaxes. If there is no leak, the pressure in the container will stabilize at a lower value than the peak value. That value is indicated at S in FIG. 2. If there is a leak, the pressure will drop off to a lower value indicated at L, and will probably continue to decline from there. The period of time required for the pressure to stabilize, from initial pressurization, is indicated at T. In a conventional prior art leak tester, the pressure applied is monitored until time T is reached. If the pressure at that point in time is at the lower level L, there is a leak and the container is rejected.

The present invention is based in part on the realization that it is not in fact necessary to monitor the pressure within the container for the whole of the time until point T is reached; momentary measurement at time T is sufficient. Preferably, the pressure is also monitored at or slightly below the peak pressure P in order to provide assurance that initial pressurization has properly been achieved. This point is indicated at T' in FIG. 2.

Figure 3:
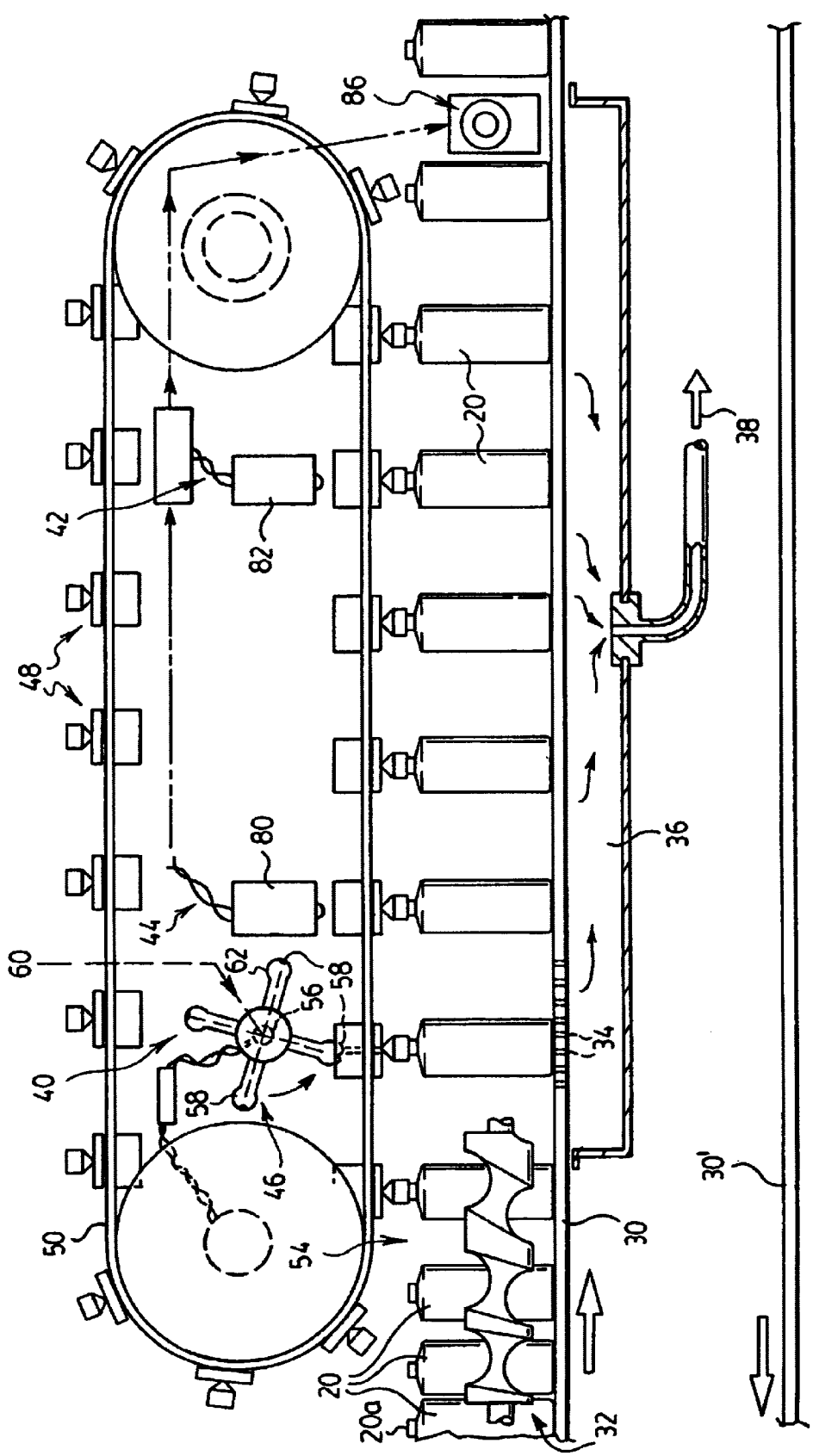
FIG. 3 is a side elevational view of a leak testing apparatus in accordance with a preferred embodiment of the invention.

FIG. 3 illustrates an apparatus in accordance with the invention. Containers 20 to be tested are conveyed seriatim along a linear path defined by a belt conveyor 30. A conventional screw mechanism 32 appropriately spaces the containers 20 on belt conveyor 30. The containers are held on the conveyor by suction applied through openings in the belt, some of which are indicated at 34, from a vacuum chamber 36 connected to a source of suction as indicated at 38. A return run of belt 30 is indicated at 30' in FIG. 3.

As will be described in more detail later, the apparatus provides a first station generally indicated at 40 at which the containers are pressurized, and a test station generally indicated at 42 at which the pressure in the containers is checked to determine whether the pressure is at or below the stable pressure S indicated in FIG. 2. At the first station 40, each successive container is pressurized using a source of pressurized fluid (typically air) that provides a defined pressure. Each container is then sealed to maintain pressurization and disconnected from the pressure source. The container remains sealed for the time it takes to travel from station 40 to the test station 42. The spacing between the two stations and the speed of conveyor belt 30 are selected so that the time each container takes to travel from station 40 to station 42 corresponds to the time required for the pressure within the container to stabilize if there is no leak. In other words, test station 42 is located so as to correspond to time T in FIG. 2. In this particular embodiment, the pressure is also checked at a point corresponding to T' in FIG. 2 in order to verify that initial pressurization of the container has been satisfactorily achieved. In FIG. 3 this point is represented by a "verify" station 44.

In contrast to the prior art, the containers are pressurized only momentarily (at station 40), and the pressure is not monitored throughout the time it takes to reach point T, but only momentarily first at verify station 44 and second at test station 42. As noted previously, this avoids the need for air hoses and wiring connecting each container back to a common source for pressurized air, and pressure monitoring the equipment.

FIG. 3 shows a single pressurization unit 46 that is used to pressurize all of the containers, and a series of individual, self-contained test heads 48 that can be energized when the pressure in the container is to be measured, i.e. at stations 44 and 42. As will be described, the test heads also provide for momentary inter-connection between each container and the pressurization unit 46.

Figure 4:
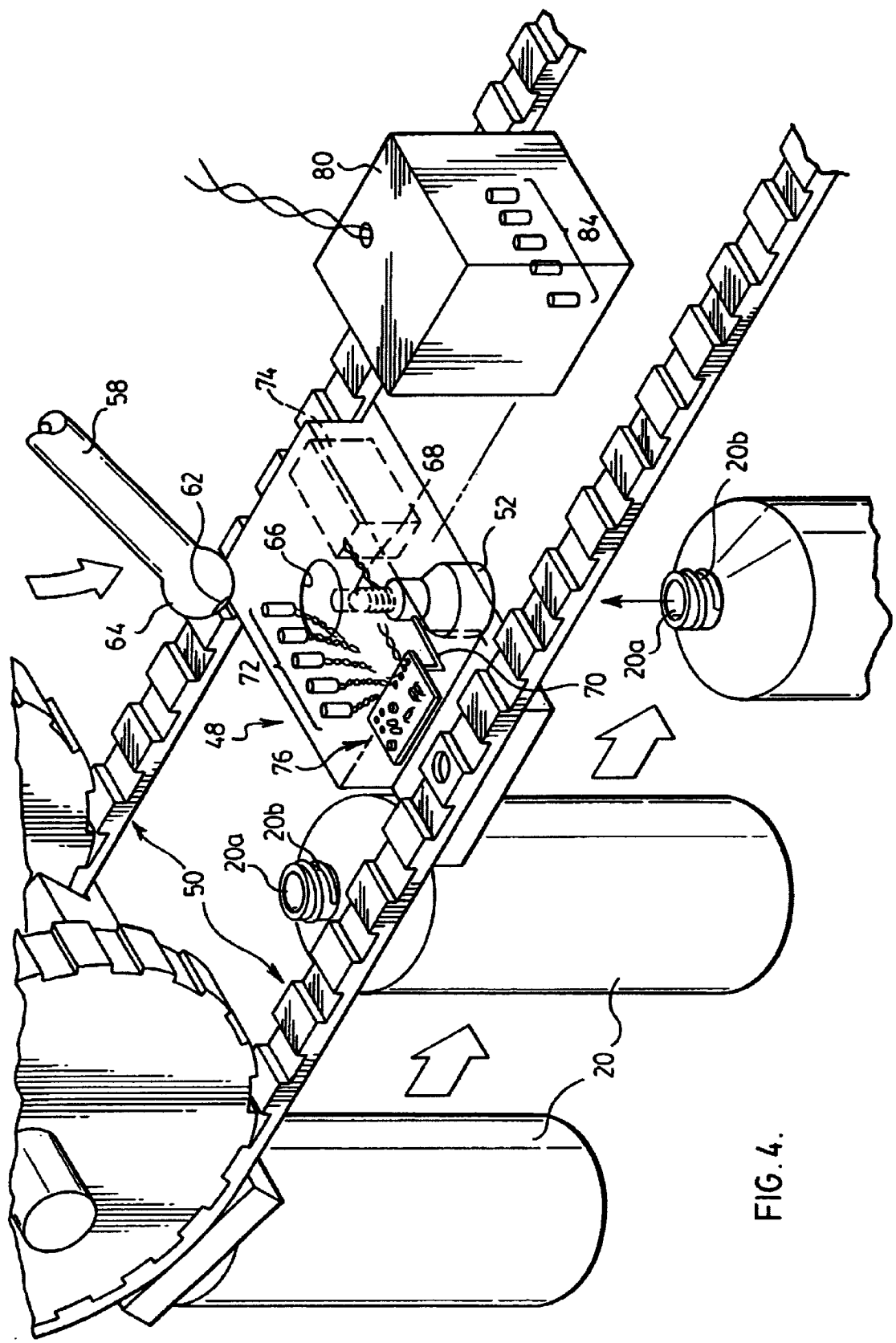
FIG. 4 is a perspective view from above of the part of the apparatus that appears at the left in FIG. 3.

FIG. 4 shows one of the test heads 48 mounted between a pair of endless belts 50. The belts travel in the path that is shown in FIG. 3 so that the test heads are successively brought into engagement with the mouths 20a of successive ones of the containers 20 as the containers enter the leak tester. Each test head is provided on its underside with a fitting 52 that is shaped to sealingly engage over the neck 20b of a container. It can be seen from FIG. 3 that the fittings, in essence, swing down and onto the necks of successive containers as they enter the leak tester, generally in the regionindicated at 54 in FIG. 3. The test head and fitting are best shown in FIG. 4.

Reverting to FIG. 3, the pressurization unit 46 generally resembles a "spider" and comprises a central hub 56 that rotates about a horizontal axis, and a series of four arms 58 that extend radially from the hub. A source of air under pressure is indicated at 60 and is connected to the hub by a suitable rotary coupling (not shown) where it communicates with a central air passageway and then with radial passageways 62 that extend along the arms 58. Unit 46 is driven in rotation about its horizontal axis by a motor (not shown) in timed relation with the movement of the belts 50 that carry the test heads 48, so that the outer end of each arm 58 comes into contact with each successive test head 48 as the test head reaches station 40.

As best seen in FIG. 4, each of the arms 58 has a generally spherical outer end portion 64, and each test head has a generally complimentarily shaped recess 66 for receiving the spherical end 64 of the arm 58. An outer end portion of the air passageway within arm 58 is indicated at 62. The recess 66 in the test head 48 communicates via a one-way (ball) valve 68 with the fitting 52 that engages the neck of each container. Thus, as each test head enters the station 40, one of the arms 58 of the pressurization unit 46 enters the recess 66 in the test head. Pressurized air from unit 46 opens valve 68 so that air from the source flows into and pressurizes the container 20. As the test head 48 moves through and out of station 40, continued rotation of the pressurization unit 46 brings the arm 58 out of engagement with the test head 48, the valve 68 closes, and the container is sealed to maintain pressurization.

Test head 48 includes a pressure transducer for measuring the pressure in the container, represented at 70, a group of five optical emitters and receivers 72 spaced transversely of the head, a battery power supply 74, and associated circuitry 76 including an on-board processor. The circuitry is normally de-energized, i.e. in "sleep" mode.

While additional emitters and receivers may be provided for additional functionality, in this particular embodiment there are three emitters (infrared LEDs) and two receivers (photo-sensitive transistors) as follows:

1. Photo Receiver (awakens or energizes the circuit)
2. Photo Receiver (activates calibration mode)
3. Infrared LED emitter (calibration mode high signal)
4. Infrared LED emitter (calibration mode low signal)
5. Infrared LED emitter (reject signal)

At the "verify" station 44 and "test" station 42 (see FIG. 3) are respective stationary heads 80 and 82 that carry optical emitters and receivers corresponding inversely to the emitters and receivers 72 of the test head 48. In other words, each of the heads 80 and 82 carries two infrared emitters to correspond to the photo receivers 1 and 2 above and three photo receivers that correspond to the infrared emitters 3, 4 and 5 above. These emitters and receivers are generally indicated at 84 in the case of the head 80 that is shown in FIG. 4 and are the same in head 82.

Calibration Mode

During initial start up the leak tester is calibrated to suit the particular containers to be tested. This is achieved by selecting "Calibration Mode" on a main controller (not shown). This causes an optical signal to be sent to the on-board processors of each test head 48 as it passes stationary head 80 via one of the stationary infrared LED emitters 84. This signal is received on-board by a photo sensitive receiver 72 causing the onboard processor to be placed in calibration mode. The calibration sequence requires the operator to select on the main controller a container of approximate size as the one to be tested. This sets a fill air timer (not shown) to the approximate setting.

Several containers are fed through the leak tester. Output infrared LEDs 72 indicate either a high or low fill on the tested samples and the fill pressure is incrementally adjusted via the fill timer. These incremental adjustments are made either up or down as indicated by the output infrared LED emitters 72 on board each test head 48. Once the correct pressure is achieved, no LED outputs either high or low will be seen by the stationary photo sensitive receivers 84. The system is now calibrated and ready for production testing. The calibration signal is switched off and the test mode is selected by default.

Test Mode

The containers 20 and test heads 48 meet as they move in a linear path along the conveyor. Each container 20 is pressurized at the fill station 40. Then at "verify" station 44 a signal from an infrared optical emitter 84 energizes the on-board circuitry 76, which is normally in sleep mode. A signal from the pressure transducer 70 is momentary monitored and the data is stored into the memory of the individual on-board processor before the circuit goes back into the normal sleep mode. The duration of the wake up, monitor, and back to sleep cycle may be less than ten milliseconds.

The containers continue along the linear path until they reach the test station 42 where a signal from another stationary infrared optical emitter again energizes the on-board circuit. The signal from the pressure transducer is once again monitored and this data is compared with the stored memory data and a calculation is made to determine if the pressure has dropped sufficiently for the container to be regarded a leaker. If so, an output optical signal from the on-board circuit signals a stationary photo sensitive receiver in head 82 which in turn signals the main controller that the container is a reject and should be ejected from the conveyor at the reject station. A signal is sent to an ejector unit 86 that includes a ram that will knock the rejected container off the conveyor 30 and into a suitable receptacle (not shown).

In summary, as each container 20 enters the leak tester, a test head 48 is brought into engagement with the mouth of the container and the container is momentarily pressurized from the pressurization unit 46 at the first station 40. As the test head moves through and out of the station, the container is sealed (by the one-way valve 68 shown in FIG. 4) and pressure from the pressurization unit is terminated as the test head moves out of range of the unit 46.

As the test head enters the verify station 44, the circuitry 76 is momentarily energized and a pressure readings taken. The circuitry 76 remains de-energized until the test head enters station 42. The circuitry is then momentarily re-energized and a second pressure reading is taken. The two readings are compared and, if the container "fails" a signal is sent to the ejector 86 to reject the container. Containers that remain on the conveyor are considered to have passed the leak test and are conveyed away from the tester for subsequent handling.

Figure 7:
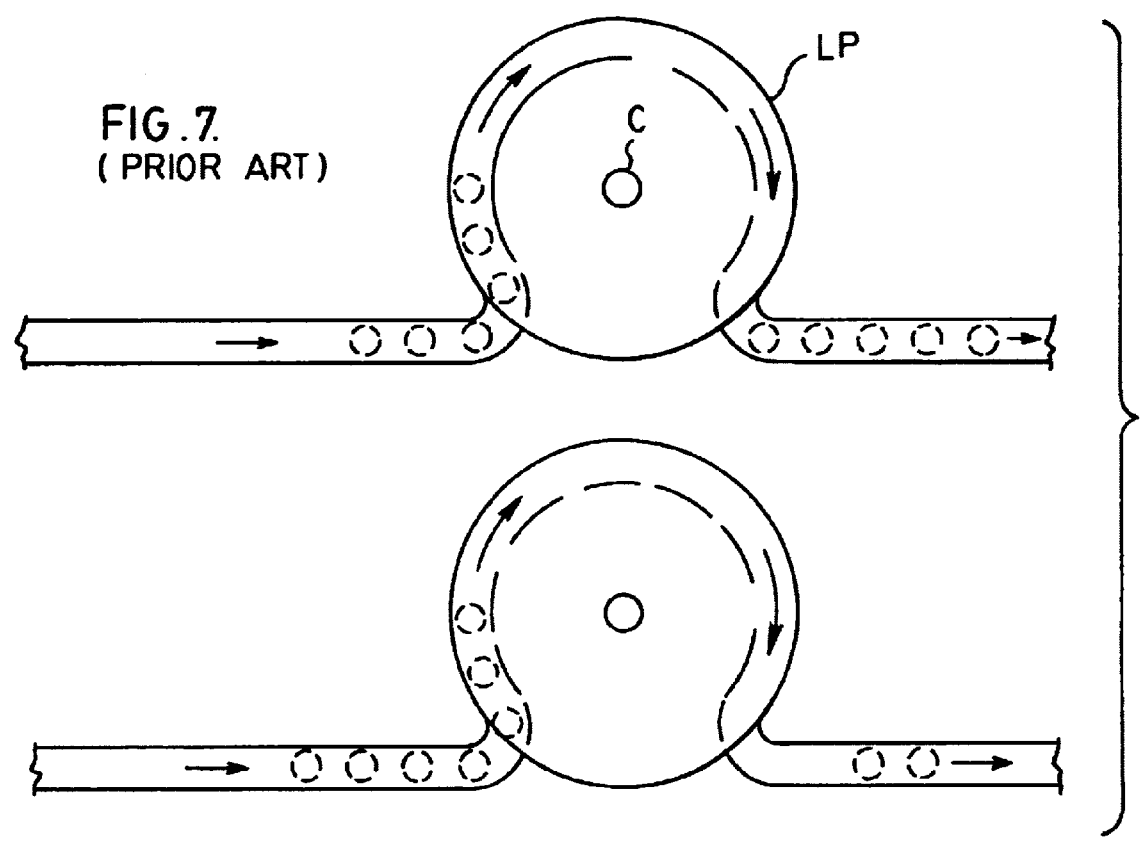

As noted previously, the invention provides a number of advantages over the prior art. A primary advantage is that the leak tester does not restrict the speed of container production (within reason). The test station 42 can be positioned downstream from the air pressurization station 40 at whatever distance is required to allow time for the pressure within the containers be stabilize and be measured. In a prior art leak tester, such as that shown in FIG. 7, the time is limited by the time that the containers are in a part-circular loop LP of the leak tester. During that time, the containers must remain connected to a central point C by both air hoses and wiring for appropriate pressure-monitoring equipment. Also, the prior art leak testers, such as shown in FIG. 7, require substantial lateral space as can be seen from the two leak testers shown.

Figure 8:
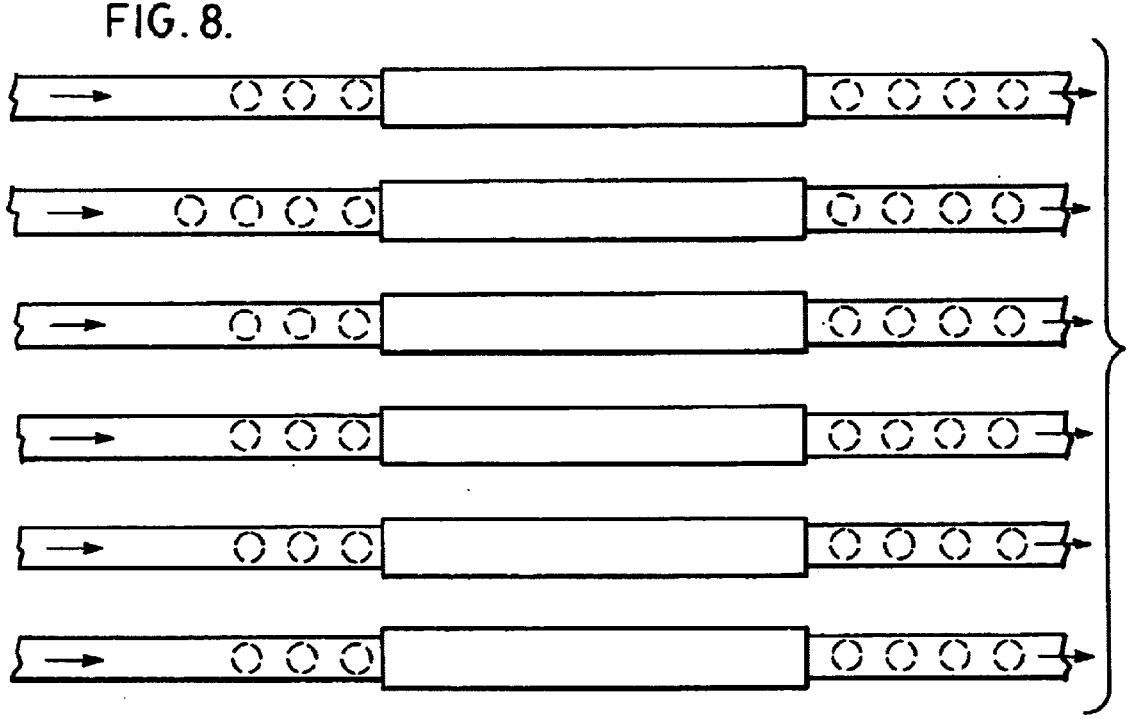

In contrast, leak testers of the form provided by the present invention preferably provide a linear test path which can be as long as required for the test cycle to be completed. A large number of leak testers can be accommodated side-by-side, as shown in FIG. 8.

Figure 5:
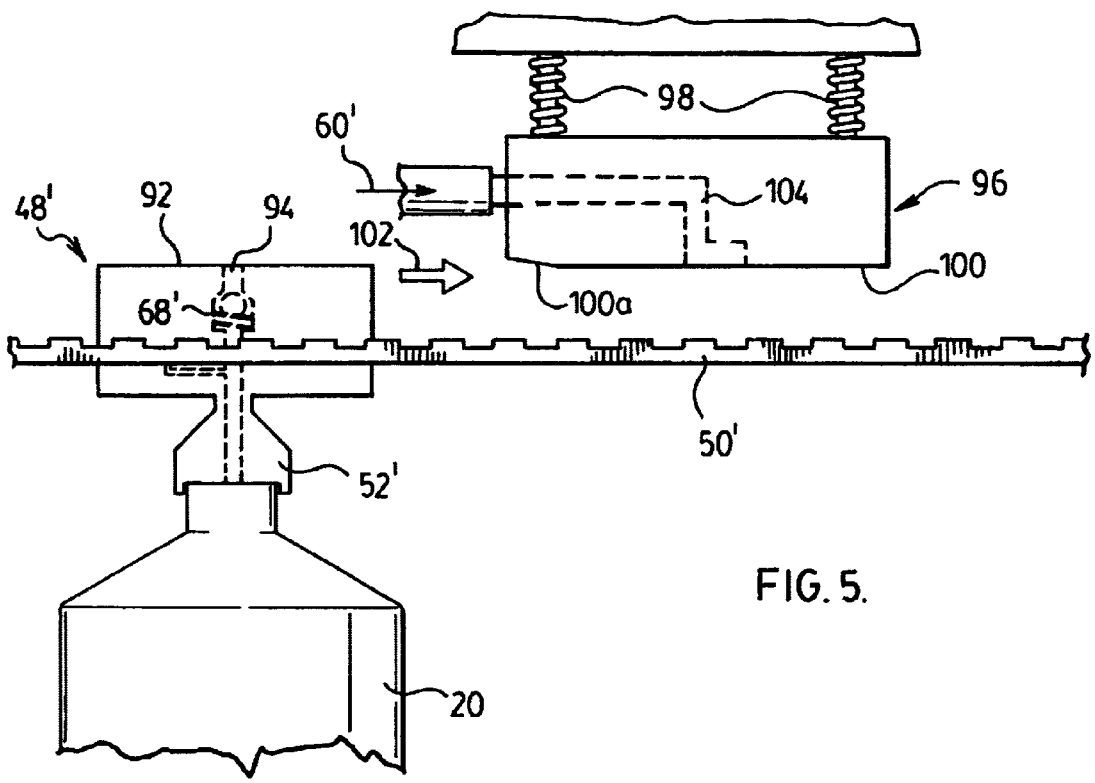
FIGS. 5 and 6 are sequential side elevational views of an alternative form of test head; and, FIGS. 7 and 8 are schematic plan views illustrating, respectively, two prior art leak testers disposed side-by-side, as compared with a much larger number of leak testers that can be accommodated in equivalent space in accordance with the invention.
Figure 6:
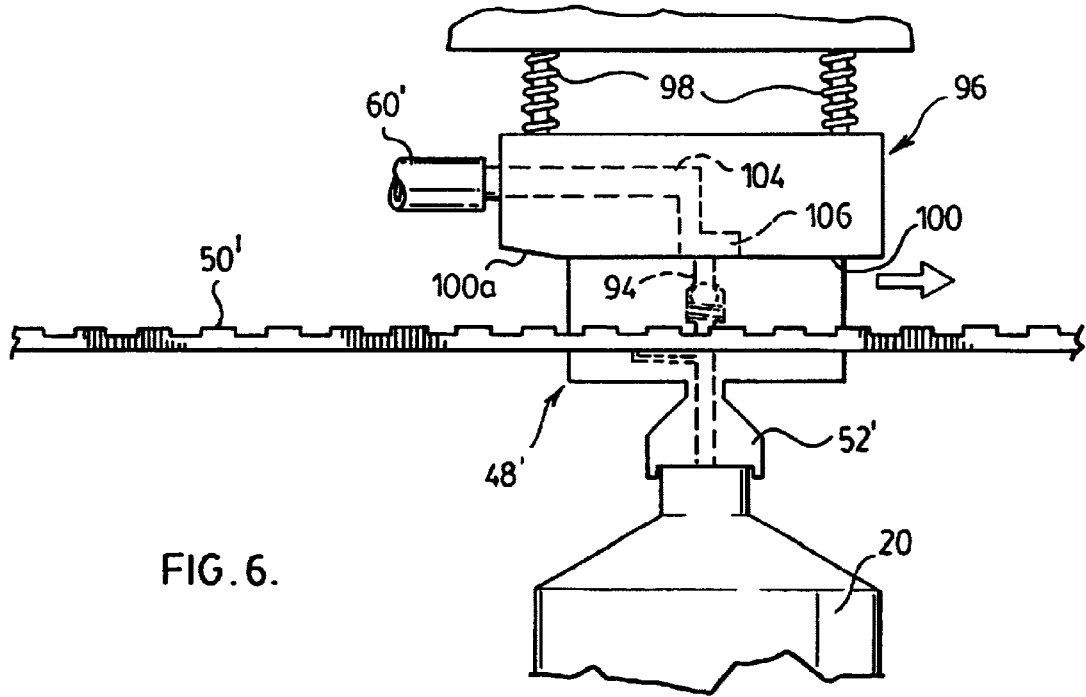

Finally, FIGS. 5 and 6 show an alternative form of pressure head for pressurizing the containers at station 40 (FIG. 3). In this embodiment, the test heads 48 are essentially the same as described previously except that the top surface of the test head is flat. The top surface of the test head is denoted 92. Instead of the recess 66 shown in FIG. 4, in the embodiment of FIGS. 5 and 6, a plain bore 94 opens into the top surface 92. Otherwise, primed reference numerals are used in FIGS. 5 and 6 to denote parts that correspond with parts shown in previous views.

Instead of a rotary pressurization unit, the embodiment of FIGS. 5 and 6 employs a stationary pressurization head 96 that is suspended by coil springs 98 from a fixed part of the apparatus. The head 96 has a bottom surface 100 that is designed to make face-to-face contact with the top surface 92 of the test head 48'. The springs 98 maintain the test head 96 with its lower surface slightly below the level of the top surface 92 of the test head 48' as the test head approaches in the direction of arrow 102 in FIG. 5. Surface 100 is chamfered as indicated at 100a so that the test head 48' can effectively "ride under" the head 96 against the biassing effect of the springs 98. The springs will then maintain head 96 pressed against the top surface of the test head as the test head travels through station 40. The source 60' of pressurized air communicates with a passageway 104 within the pressurization head 96 that opens into surface 100. FIG. 6 shows the test head 48' essentially at the mid-point of its travel through station 40, with source 60' in communication with the interior of container 20. Passageway 104 includes a port 106 that is slightly elongated in the direction of travel of the test head 48' so that the source of pressurized air 60' remains in communication with the test head inlet bore 94 for sufficient time to allow the container to be fully pressurized.

Specific details of the main controller, the on-board processors of the test head, and associated circuitry and software programming have not been given since they could readily be implemented by a skilled person, and are not part of the present invention.

It will of course be appreciated that the preceding description relates to particular preferred embodiments of the invention only and that many modifications are possible within the broad scope of the invention. Some of those modifications have been indicated previously and others will be apparent to a person skilled in the art. In particular, it should be noted that, while the invention has been described in the context of a leak tester that provides an least generally linear test path, the features of the momentary pressurization and momentary pressure reading can be applied to other test path configurations.

I claim:

1. A method of leak testing moulded plastic containers, comprising the steps of:
    conveying the containers seriatim along a path;
    in respect of each successive container:
        pressurizing the container at a first station along said path using a source of pressurized fluid providing a defined pressure;
        sealing the container to maintain pressurization and disconnecting the container from said source;
    providing a test station a distance downstream along said path from said first station selected to allow pressure in the container to stabilize if there is no leak in the container and;
    conveying successive sealed containers along said path from said first station to said test station;
    at said test station, momentarily determining the pressure in each successive container and providing a signal if the pressure in the container is below a defined value, indicating a leak.

2. A method as claimed in claim 1, comprising the further steps of:
    providing a verification station at a location upstream from said test station and downstream from said first station a distance appropriate to permitting verification of appropriate pressurization of the container from said source; and,
    at said verification station, momentarily determining the pressure in each successive container and providing a signal if proper pressurization has not been achieved.

3. A method as claimed in claim 1, wherein said path is a linear path extending from said first station to said test station.

4. A method as claimed in claim 1, further comprising the step of removing from said path downstream of said test station, a container that has been determined to have a leak.

5. Apparatus for leak testing moulded plastic containers, comprising:
    a conveyor for transporting the containers seriatim along a path;
    a pressurization unit at a first station along said path, including a source of pressurized fluid providing a defined pressure;
    a plurality of test heads, each adapted to sealingly engage a mouth of a container to be tested;
    a test station spaced from said first station a distance selected to allow pressure in the a container to stabilize if there is no leak in the container;
    means for bringing the test heads successively into said sealing engagement with the mouths of respective containers approaching said first station, and for successively disengaging the test heads from the containers downstream from said test station;
    each said test head being adapted to momentarily engage said source of pressurized fluid at said first station for pressurizing a container in sealing engagement with the head, and including means for sealing the container to maintain pressurization after disengagement from said source, said head further including a pressure transducer for measuring the pressure in the container, means for signalling a measured pressure lower than a defined value, and battery power supply means, the test head being normally de-energized, but capable of being remotely energized when pressure in the container is to be measured; and,
    means for remotely energizing successive test heads at said test station, so that said signalling means provides an indication if the measured pressure within the container is lower than said defined pressure.

6. Apparatus as claimed in claim 5, further comprising:
    a verification station located along said path upstream from said test station and downstream from said first station a distance selected as appropriate to determining proper pressurization of containers at said first station; and,
    means for remotely energizing successive test heads at said verification station, said signalling means of said test heads providing an indication if proper pressurization of a container has not been achieved.

7. Apparatus as claimed in claim 5, wherein said path is a linear path extending from said first station to said test station.

8. Apparatus as claimed in claim 7, wherein said conveyor is an endless belt conveyor having an upper run which defines said linear path and on which the containers are conveyed along said path, and wherein said means for bringing the test heads successively into said sealing engagement with the mouths of respective containers approaching said first station, and for successively disengaging the test heads from the containers downstream from said test station comprises a second belt conveyor disposed above the first-mentioned belt conveyor and having a lower run parallel to the upper run of the first-mentioned belt conveyor and spaced therefrom a distance to accommodate said containers, said test heads being carried by said second belt conveyor and spaced along said conveyor to correspond with the spacing of the containers on the first-mentioned belt conveyor, the second belt conveyor being operable to bring said test heads downwardly and into engagement with successive containers approaching said first station on said first-mentioned belt conveyor and to disengage the test heads upwardly from the containers downstream from said test station.

9. Apparatus as claimed in claim 8, wherein said pressurization unit and each test head are adapted to move into a co-operating relationship as each successive test head moves through said first station, in which said source of pressurized fluid momentarily communicates through said test head with a said container for pressurizing the container.

10. Apparatus as claimed in claim 9, wherein said pressurization unit comprising a rotary pressurization head having a series of arms that are brought into a said co-operating relationship with successive test heads as they pass through said first station, each arm communicating with said source of pressurized fluid so that the a container engaged with each test head is momentarily pressurized at said first station.

11. Apparatus as claimed in claim 9, wherein said pressurization unit comprises a stationary pressurization head having a generally flat lower surface, and wherein each said test head has a generally flat upper surface which slides across said lower surface of the pressurization head as the test head moves through said first station, said surfaces including respective ports that momentarily communicate so that the a container engaged with a test head is pressurized through the test head as the head moves through said first station.

12. Apparatus as claimed in claim 11, wherein the co-operating surfaces of the pressurization head and each test head are shaped to ensure smooth sliding movement of the respective surfaces against one another as the test heads move through the first station, and wherein the apparatus further comprises means biassing the pressurization head downwardly so that the pressurization head is deflected upwardly against said biassing as each test head enters said first station.

13. Apparatus as claimed in claim 5, further comprising optical emitter and receiver means carried by each said test head, said optical emitter means including said means for signalling the measured pressure lower than a defined value, and stationary inversely corresponding optical receiver and emitter means at said test station, said stationary optical receiver means responding to optical emitter means of said test head, and said stationary optical emitter means providing signals to said optical receiver means of the test head for remotely energizing the test head when pressure in the container is to be measured.

14. Apparatus as claimed in claim 13, further comprising:
  a verification station located along said path upstream from said test station and downstream from said first station a distance selected as appropriate to determining proper pressurization of containers at said first station; and,
  stationary optical receiver means at said verification station responding to optical emitter means of said test head, and said stationary optical emitter means providing signals to said optical receiver means of the test head for remotely energizing the test head when pressure in the container is to be measured.

* * * * *